United States Patent [19]

Tobiasz

[11] Patent Number: 5,488,895
[45] Date of Patent: Feb. 6, 1996

[54] CLUTCH SLAVE CYLINDER

[75] Inventor: Andrae Tobiasz, Epinay, Sur Seine, France

[73] Assignee: Automotive Products, France SA, Herblay-Cergy-Pontoise, France

[21] Appl. No.: 244,238

[22] PCT Filed: Sep. 17, 1993

[86] PCT No.: PCT/EP93/02514

§ 371 Date: May 13, 1994

§ 102(e) Date: May 13, 1994

[87] PCT Pub. No.: WO94/07048

PCT Pub. Date: Mar. 31, 1994

[30] Foreign Application Priority Data

Sep. 17, 1992 [FR] France ............... 92 11237

[51] Int. Cl.$^6$ ............... F16D 25/08; F16D 25/12
[52] U.S. Cl. ............... 91/519; 91/534; 91/535; 192/111 A
[58] Field of Search ............... 91/519, 534, 535, 91/513; 60/568, 574, 591, 592; 192/111 A, 70.25; 188/196 A, 196 R

[56] References Cited

U.S. PATENT DOCUMENTS

| 2,928,246 | 3/1960 | Sjodin ............... 91/519 X |
| 3,474,888 | 10/1969 | Carlson . |
| 3,828,894 | 8/1974 | Crossman ............... 188/196 A X |
| 3,940,938 | 2/1976 | Durham et al. . |
| 4,802,559 | 2/1989 | Fourie et al. ............... 188/196 A |
| 5,144,878 | 9/1992 | Cadeddu ............... 60/591 X |
| 5,235,898 | 8/1993 | Delin et al. ............... 91/519 |

FOREIGN PATENT DOCUMENTS

| 310733 | 4/1989 | European Pat. Off. . |
| 467725 | 1/1992 | European Pat. Off. . |
| 493992 | 7/1992 | European Pat. Off. . |
| 1183450 | 7/1959 | France . |
| 2149821 | 3/1973 | France . |
| 2483022 | 11/1981 | France . |
| 2604228 | 3/1988 | France . |
| 2612464 | 9/1988 | France . |
| 2124948 | 11/1972 | Germany . |
| 3021386 | 12/1981 | Germany . |
| 45-34525 | 11/1970 | Japan ............... 192/111 A |
| 45-41161 | 12/1970 | Japan ............... 192/111 A |
| 45-38284 | 12/1970 | Japan ............... 192/111 A |
| 47-33308 | 8/1972 | Japan ............... 192/111 A |

Primary Examiner—John E. Ryznic
Attorney, Agent, or Firm—Paul E. Milliken; Lee A. Germain

[57] ABSTRACT

A clutch hydraulic slave cylinder comprising a cylinder body, a primary piston sealingly reciprocable relative to the body and co-operating with the body to form a first fluid chamber within said body, and a secondary piston sealingly reciprocable relative to the primary piston and co-operating with the primary piston to form a second fluid chamber. the second fluid chamber is connected to the first fluid chamber through a valve means. The primary piston is biased by a spring means from a fully retracted condition to an at-rest condition in which it can exert a pre-load on a clutch bearing, and said valve means is open when the primary piston is in the fully retracted condition, and is closed when the primary piston is in the at-rest condition.

16 Claims, 6 Drawing Sheets

FIG.5

CLUTCH SLAVE CYLINDER

This application is a Rule 371 of PCT/US93/02514 filed Sep. 17, 1993.

This invention relates to clutch hydraulic slave cylinders for use with clutch hydraulic actuators, particularly for use with motor vehicle friction clutches.

A problem with hydraulic clutch actuator systems is that as the vehicle clutch plate wears, the hydraulic slave cylinder piston is returned to a different position in the cylinder housing. Therefore the working volume of the slave cylinder must be sufficient to accomodate the changes in actuator fluid volume within the slave cylinder as the piston "at-rest" position changes due to clutch driven plate wear, together with the volume of fluid displacement by the master cylinder when the clutch actuator system is operated.

With the developing trend towards more compact component parts in vehicle engine compartments it may be advantageous to reduce the overall size of a clutch slave cylinder.

The present invention provides a hydraulic slave which is axially compact.

Accordingly there is provided a clutch hydraulic slave cylinder comprising a cylinder body, a primary piston sealingly reciprocable relative to the body and cooperating with the body to form a first fluid chamber within said body, and a secondary piston sealingly reciprocable relative to the primary piston and co operating with the primary piston to form a second fluid chamber, the second fluid chamber being connected to the first fluid chamber through a valve means characterised in that the primary piston is biased by spring means from a fully retracted condition to an "at-rest" condition in which it can exert a pre-load on a clutch bearing, and said valve means is open when the primary piston is in the fully retracted condition and is closed when the primary piston is in the "at-rest" condition.

Preferably the cylinder body has a cylindrical bore therein and the primary piston reciprocates within the bore characterised in that the primary piston has a coaxial bore therein, and the secondary piston reciprocates within the coaxial bore of the primary piston.

Alternatively the cylinder body is an annular body having inner and outer cylindrical walls forming a first fluid chamber therebetween, characterised in that the inner wall extends axially beyond the outer wall and the primary piston is sealingly slideable on the radially outer surfaces of the two walls.

The invention will be described by way of example and with reference to the accompanying drawings in which

DETAILED DESCRIPTION

Figures 1, 1A:
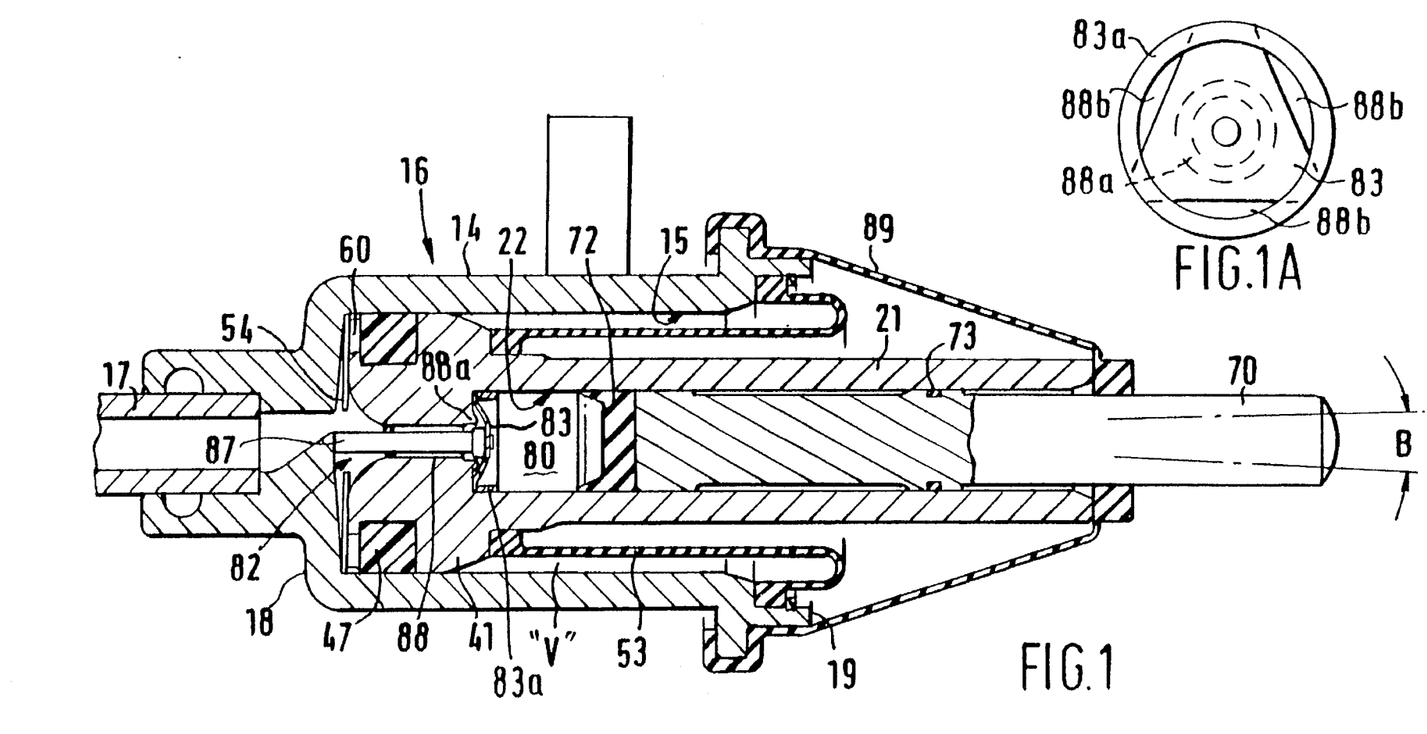
FIG. 1 is a cross section through a first embodiment of the invention.
FIG. 1A is a fragmentary view of part of the valve means used in FIG. 1.

With reference now to FIG. 1 there is illustrated a cylindrical slave cylinder 16 that operates a vehicle clutch through a lever usually pivoted to the gearbox housing.

The slave cylinder 16 has a cylinder body 14 with a cylindrical bore 15 having an end wall at one end and a mouth 19 at the other end. A primary piston 41 is slideable in the bore and is sealed in the bore 15 by a seal 47 to form a first fluid chamber 60 in the closed end of the bore. The first chamber 60 is connected to a source of hydraulic pressure through a conduit 17.

The piston has a coaxial cylindrical extension 21 thereon that extends through the mouth 19 of the bore 15.

An elastomeric boot 53 seals the piston 41 in the mouth 19 of the bore to form a fluid reservoir "V". The seal 47 allows a slight fluid leakage between the fluid chamber 60 and fluid reservoir "V" enclosed by the boot 53. The seal 47 acts as a non-return valve allowing the flow of fluid back from the reservoir "V" into the chamber 60 when the pressure inside the chamber 60 is less than the pressure in said reservoir.

The coaxial extension 21 of the piston has a blind coaxial cylindrical bore 22 therein in which a secondary piston 70 is located. The piston is sealed to the bore 22 by seal 72, to form a second fluid chamber 80 in the blind end of the bore 22. A seal 73 acts as a "Friction Brake" to maintain in position the piston 70 which acts as a push rod to operate the associated clutch operating lever (not shown). The second fluid chamber 80 is connected to the first fluid chamber 60 by an orifice 88 which is opened and closed by a valve means 82. The valve means 82 is a mushroom shaped poppet valve having a generally triangular rubber head 83 (see fragmentary view of FIG. 1A) and a Stem 87 which passes through orifice 88 in the primary piston 41. The head 83 is Located in the secondary chamber 80 by an annular ring 83a and has a closed condition when the centre portion of the head seals against a valve seat 88a.

The stem 87 of the valve means 82 can contact the end wall 18 when the primary piston 41 is in a fully retracted condition to open the valve by disengaging the central portion of head 83 from valve seat 88a to allow flow through openings 88b (see FIG. 1A).

The primary piston 41 is biased away from the end wall 18 by a belleville spring 54 which exerts a pre load on the clutch release lever (not shown), through the primary piston, a hydraulic link formed by the second fluid chamber 80, and the second piston 70.

The diameter of the second fluid chamber 80 is substantially smaller than the diameter of the primary fluid chamber 60 so that the clutch release mechanism is operated by the primary piston 41 and the wear compensation takes place through the secondary piston 70.

The pistons 41, 70 are retained in place before fitting on a vehicle by straps 89 which burst on the first operation of the clutch actuator system.

On initial fitting to a vehicle the primary piston 41 is held in position shown in FIG. 1 by plastic delivery straps 89 with valve means 82 open.

When pressurised fluid is introduced into the slave cylinder 16 it will fill two chambers 60 and 80. A further pressure will cause the secondary piston 70 to move the clutch release bearing (not shown) into abutment with the clutch diaphragm spring fingers. The area of the secondary piston exposed to fluid pressure is about 60% of the area of the primary piston 41 exposed to fluid pressure. Thereafter as fluid pressure builds up the straps 89 either burst or may be removed in other ways and the primary piston 41 will then move to operate the clutch by exerting a release load on the clutch diaphragm spring fingers. This allows the valve member 82 to close isolating the second chamber 80. When the fluid pressure is released the spring fingers will push against the secondary piston 70, but since the valve means 82 is closed, the fluid within the secondary chamber forms a hydraulic link and the primary piston means 41 is returned by the load in the diaphragm spring fingers acting on the secondary piston 70 until the piston 41 abuts the spring 54 and is held away from the fully retracted piston in an "at-rest" condition by said spring 54 at which point the valve means 82 is held closed.

As the clutch plate wears, the ends of the diaphragm spring fingers move towards the gearbox pushing the primary piston member 41 and the secondary piston 70 against the bias of the spring 54 further back towards the end wall 18 causing the valve means 82 to open, consequently allowing the volumetric capacity of the secondary chamber to decrease and fluid to exit the secondary chamber 80 through the valve means 82.

When the diaphragm spring fingers exert substantially no load on the secondary piston 70 the spring 54 exerts a preload on the primary piston 41 and will move the piston 41 away from the end wall 18 and the valve means 82 will close.

This effectively means that in an equalibrium condition in which there is substantially no hydraulic pressure in the chamber 60, the spring 54 exerts a preload on the release bearing and the valve 82 is closed.

The piston 41, with the secondary piston 70, and valve means 82 are able to tilt by an angle B in the bore 15 of the cylinder body 14 to accomodate the relative eccentric movement of the attached end of the clutch release lever.

The slave cylinder as described may form part of a pre-filled hydraulic clutch actuation system of the type described in European Patent EP-A-0 146 283.

Figure 2:
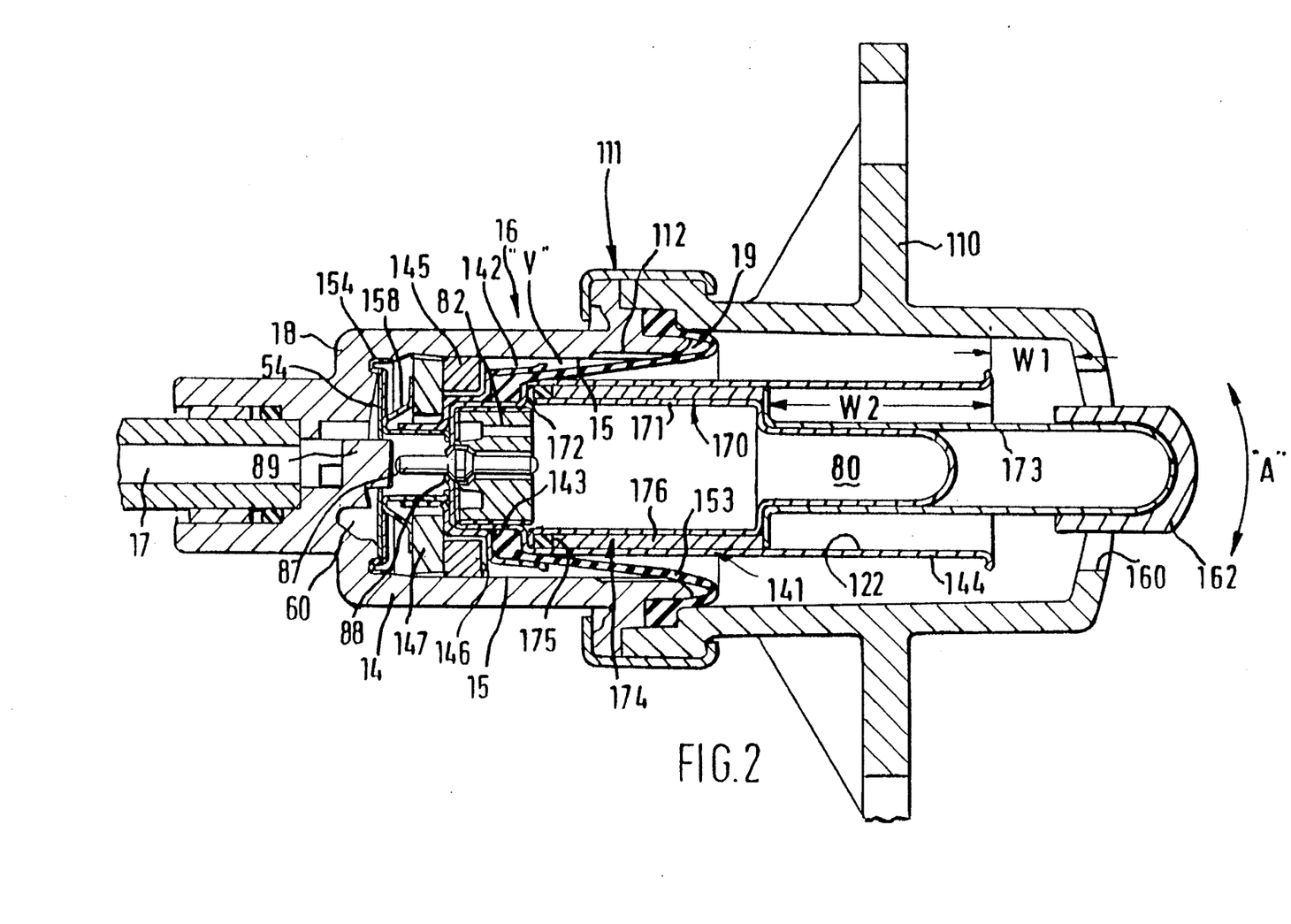
FIG. 2 is a longitudinal cross-section through a second embodiment of the invention.
Figure 3:
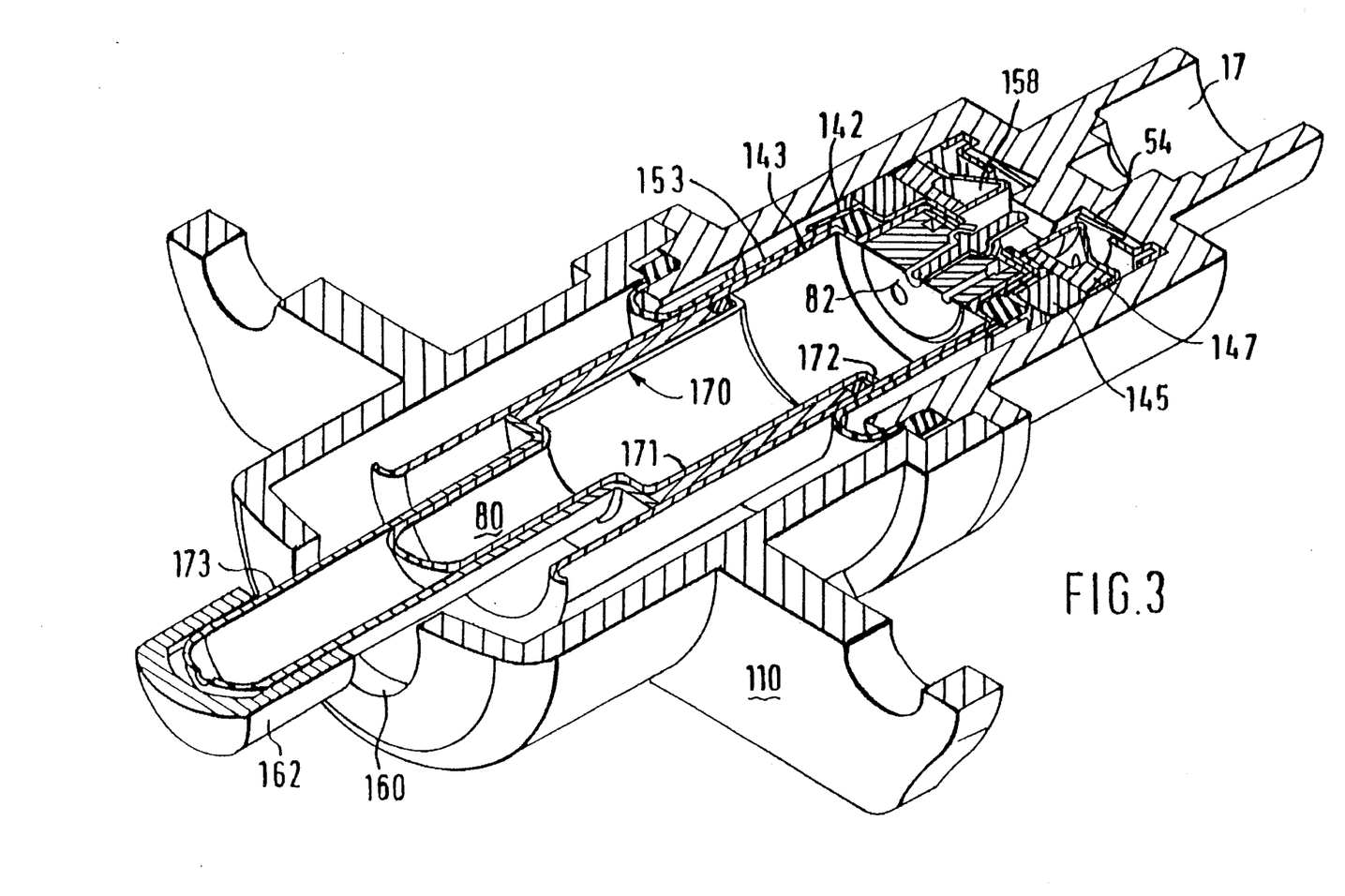
FIG. 3 is a section through an isometric view of the embodiment of FIG. 2.

With reference to FIG. 2 and FIG. 3, there is illustrated a slave cylinder of similar construction as that shown in FIG. 1. Only the differences will be described in detail and the same component reference numbers will be used where appropriate.

The mouth 19 of the bore 15 is closed by a flanged cover 110 which is used for attachment to a mounting point (not shown). The cover 110 is secured to the slave cylinder body 14 by clips 111. The diaphragm 153 has its outer peripheral bead secured between the cylinder body 14 and the cover 110.

The primary piston 141 comprises several components formed from sheet metal. These components comprise a stepped diameter annular base portion 142 having its larger diameter opening facing the mouth 19. Fitted into the base portion is a forward portion 143 and the inner periphery of the bead of the diaphragm 153 is located between the base portion 142 and the forward portion 143. The forward portion 143 has an extension 144 which extends towards the cover 110 and which in use serves to limit the forward movement of the primary piston 141. The side of the base portion 142 adjacent the inlet port 17 has located on the different diameter portions, a guide ring 145 formed preferably of nylon, which may be held in an "L" shaped annular housing 146.

Figure 4:
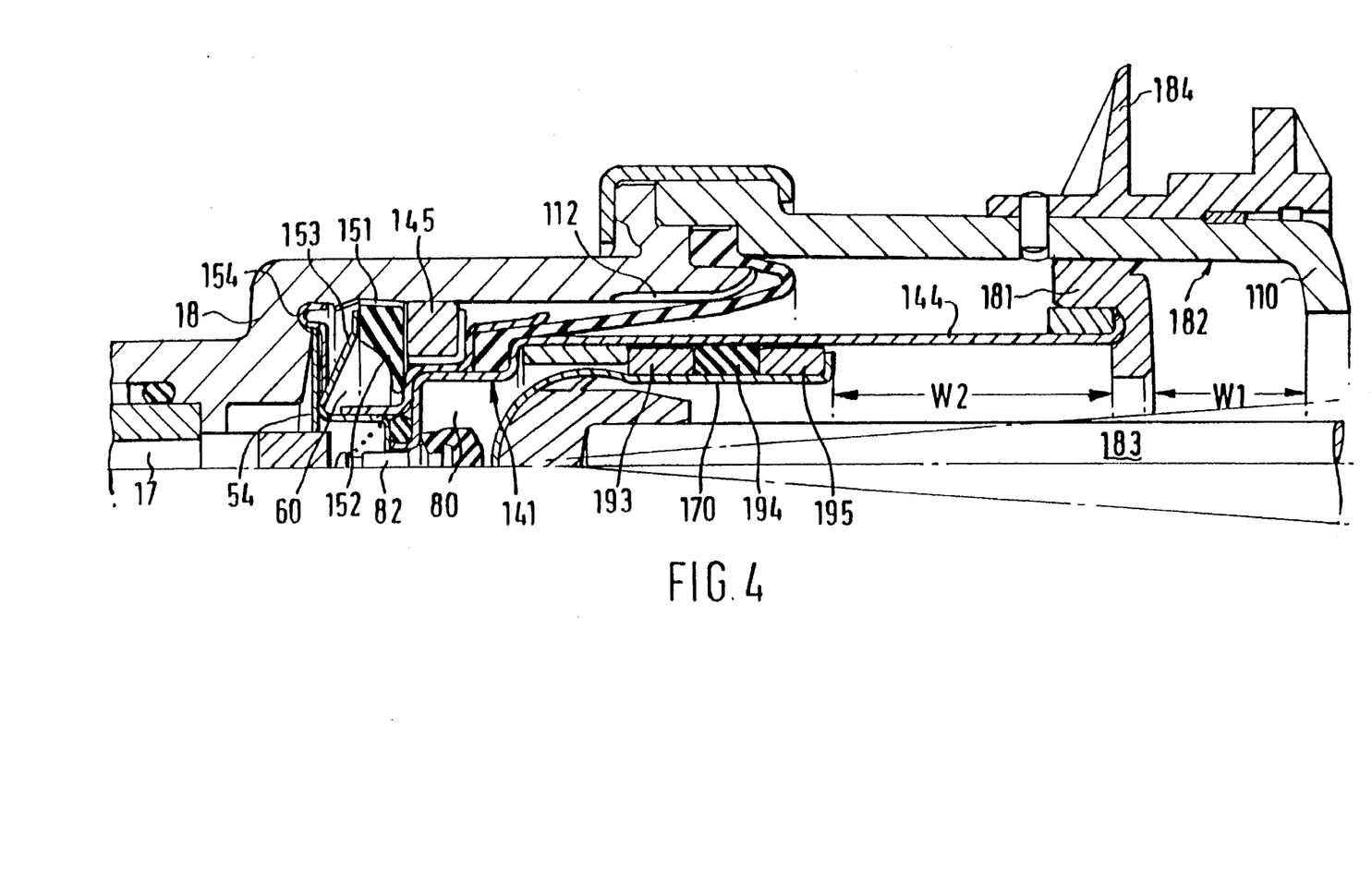
FIG. 4 is a longitudinal section through a third slave cylinder.

A seal 147 is located adjacent the guide 145 and again may be a single elastomeric seal, or may be a two part seal comprising an external polymeric cup 151, preferably nylon, with an inner elastomer seal cup 152 as shown in FIG. 4.

The seal 147 is held in position in the base portion 142 of the piston member 141 by a retainer 158 which fits into the smallest diameter central portion of the base portion 142. The retainer 158 is shaped so that its outer portion holds the outer margins of the elastomeric seal cup 152 and its inner portion extends towards the end wall 18 to provide an abutment for the belleville spring 54 which acts to bias the piston member to its "at-rest" position. The spring 54 may be held in place by a spring clip 154.

The central aperture 88 in the annular base portion houses a valve means 82 which is normally closed by a spring bias but is opened by the valve stem 87 abutting a stop 89 in the end wall 18 of the bore 15.

The primary piston 141 houses a secondary piston 170, in the form of an inverted cup which is in the internal bore 122 of the forward portion 143. The secondary piston comprises two parts, a first part 171 having a radially outwardly projecting flange 172 at its open end and a projection 173 secured to the closed end. The two parts 171, 173 enclose an annular piston seal 174 comprising an elastomeric seal 175 and a plastics sleeve 176.

The projection 173 extends through an aperture 160 in the end cap 110, and has an end fitting 162 thereon for engagement with a clutch release lever (not shown).

The piston member assembly of primary and secondary pistons 141, 170 can tilt relative to the bore 15 along the arc "A".

The mouth 19 of the slave cylinder bore 15 has longitudinal external grooves 112 therein to aid filling of the clutch actuation system.

During the initial operation of the above slave cylinder, the hydraulic pressure causes the primary piston 141 to move first until the extension 144 abuts the cover 110. Thereafter an increase in pressure in chamber 60 opens the valve means 82 to allow fluid to reach the secondary piston 170 and move the secondary piston until the clutch lever is engaged.

When the driver generates a hydraulic pressure and the two pistons 141, 170 begin to move the clutch lever, the valve means 82 remains open for a short travel as pressure builds up in the secondary chamber 80 so that when the pistons are returned on release of the clutch there is a preload on the spring 54. The maximum working travel of the cylinder is the distance W1 between the case 110 and the extension 144, and the total travel available for wear compensation is W2 which is the maximum stroke of the secondary piston 170 within the primary piston.

The grooves 112 around the mouth 19 allow the prefilled hydraulic system of the type disclosed in EP 0 146 283 to be vacuum filled, when the seal 147 is in a fully forward position in alignment with the grooves 112 with the cover 110 not as yet fitted. The seal 147 never aligns with the grooves 112 during normal operation off the clutch.

With reference to FIG. 4, there is disclosed a modified version of the slave cylinder described in FIG. 2 and 3. The extension 144 of the primary piston 141 is guided for movement by a guide bush 181 which slides along a bore 182 on the internal surface of the cover 110.

The secondary piston 170 is shaped to accomodate the head of a push rod 183, allowing the push-rod 183 to tilt.

A turn-lock device 184 is fitted to the cover 110 to allow the slave cylinder to be mounted on a support by a twist and push action.

The secondary piston 170 is of a modified design with the piston seal 193, 194, 195 comprising two nylon rings (193, 195) with an elastomeric ring 194 located therebetween.

Figure 5:
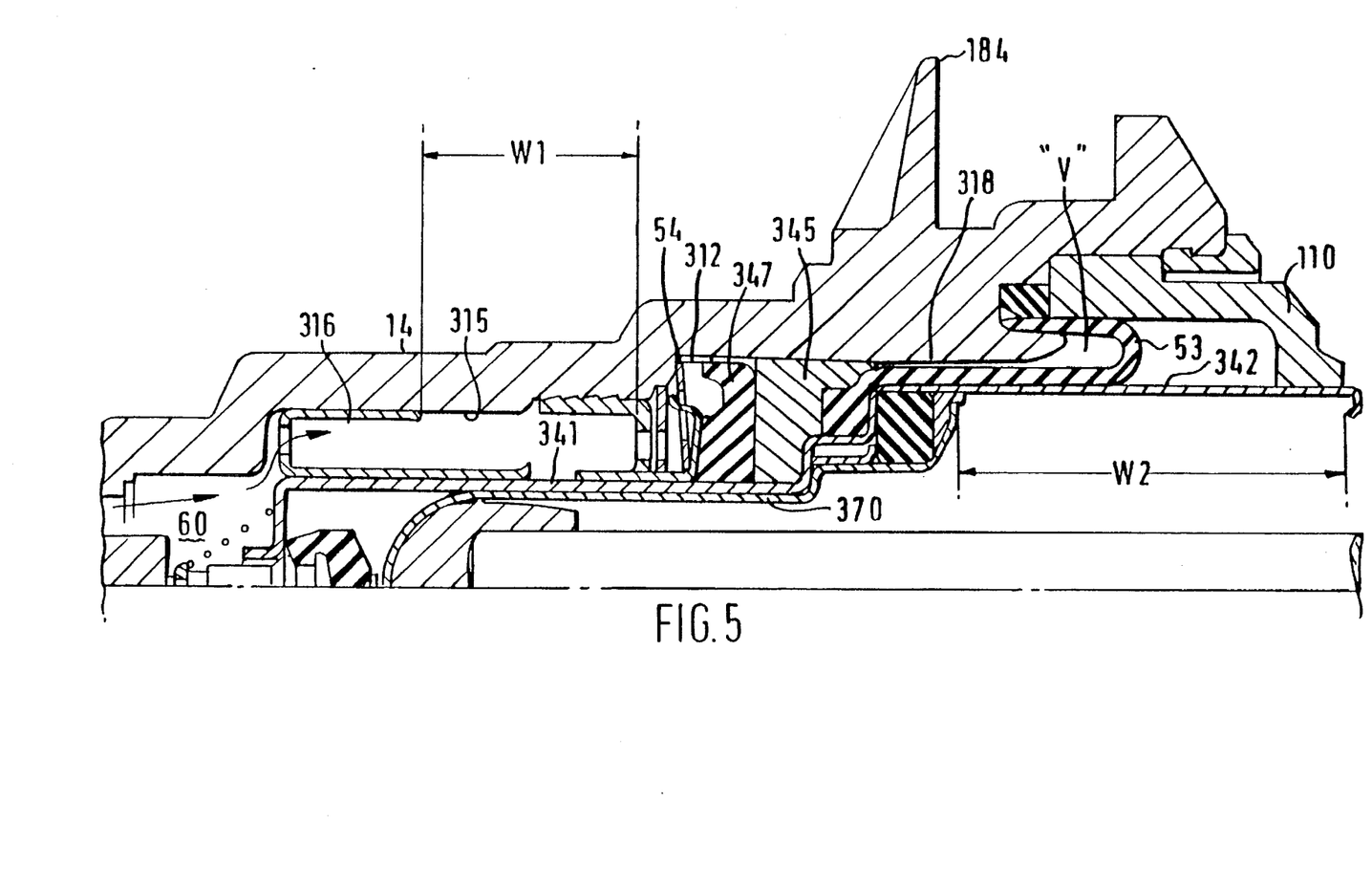
FIG. 5 is a section through yet another embodiment of the invention.

Yet another embodiment is disclosed in FIG. 5 in which the slave cylinder body 14 comprises a stepped bore. The smaller diameter portion 315 of the bore houses a hollow guide 316 which slideably supports the primary piston 341. An extension 342 of the primary piston is guided for movement on the cover 110. The secondary piston 370 is mounted within the bore or the primary piston 341. The main seal 347 for the primary piston 341 is located in the larger diameter position of the bore 318 and is held against a guide 345 by a retainer in a similar manner to that described for FIG. 4. The belleville spring 54 is located on the end face of the primary piston guide 316.

The diaphragm 53 has its inner peripheral bead between the guide 345 and the primary piston and its outer periphery located between the cylinder body 14 and the cover 110.

The advantage of this design is that the piston guide 316 can be fitted into the body 14 and then a sub-assembly including all the other components can then be pushed in place.

Grooves 312 are located in larger diameter bore 318 adjacent the seal 347 and allow recuperation communication between the chamber 60 and the reservoir "V".

In a further development the diaphragm 53 is greatly strenghtened by the inclusion of fibre reinforcement and the main seal 347, guide 345 and seal retainer can be omitted.

Figure 6:
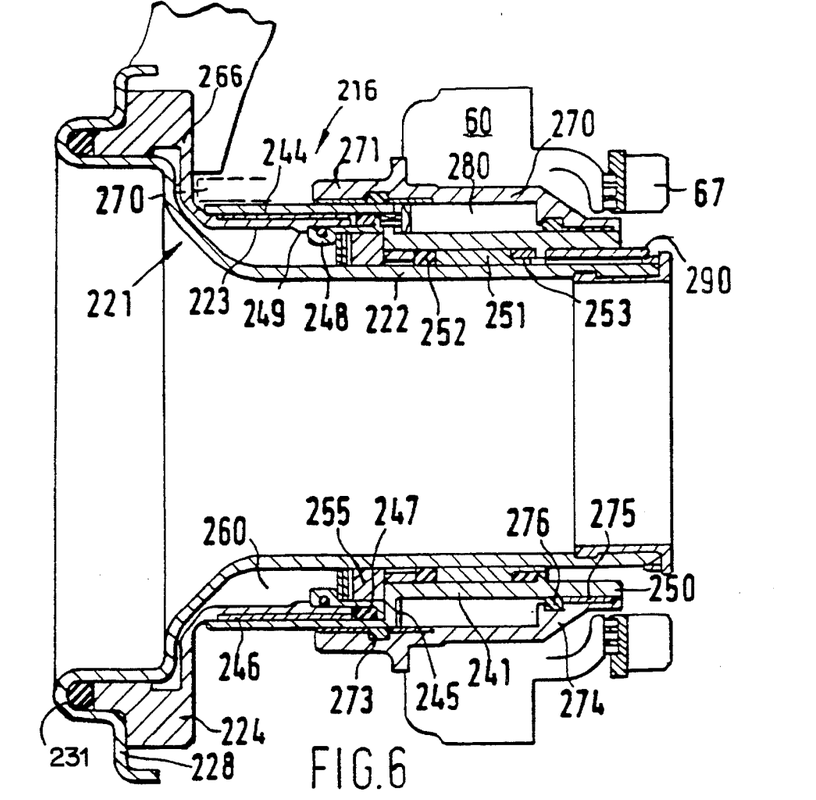
FIG. 6 is a cross-section through yet another embodiment of the invention.
Figure 7:
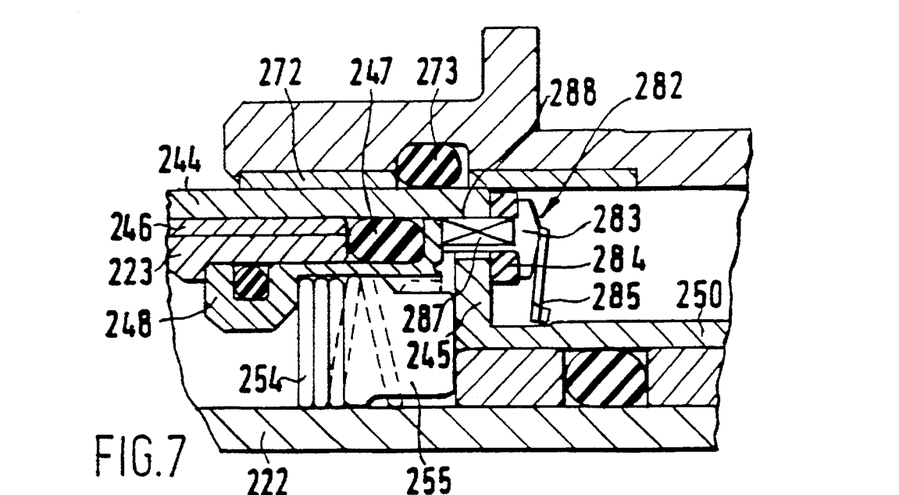
FIG. 7 is an enlargement of a portion of FIG. 6 showing the valve mechanism.

Now with reference to FIG. 6 and FIG. 7 of the drawings, a vehicle clutch is operated by an annular hydraulic clutch slave cylinder 216 arranged concentrically with a gearbox input shaft (not shown) and which in use engages the radially inner ends of the fingers of a diaphragm spring (not shown) through a bearing race 60. The slave cylinder is operated by hydraulic fluid pressure generated by a master cylinder (not shown) which is connected to the slave cylinder 16 by conduit 117. The slave cylinder 216 has a body 221 comprising a cast aluminium or moulded plastics first part 226 which includes an outer cylindrical wall 223, having a radially outwardly projecting flange 224 at one end thereof, and a sheet metal second part which includes an inner cylindrical wail 222 having a U shaped flange 228 at one end. The two parts 222, 223 are joined together at the respective end flanges 224, 228, and held in contact with a seal 231 to form a first fluid tight chamber 262 therebetween.

An annular primary piston 241 is sealingly slideable on the radially outer surface of the inner and outer cylindrical wails 222, 223. The primary piston 241 comprises a radially outer cylindrical sidewall 244, a radially inwardly extending flange 245 and a radially inner cylindrical side wall 250. The piston outer sidewall 244 is slideable on a plastics sealing ring 246 mounted on the outer surface of the outer wall 223 and an elastic sealing ring 247 is head in position by a retainer cup 248 which sits on an annular shoulder 249 on the radially inner surface of the outer wall 223.

The piston inner sidewall 250 slides on a plastics sealing ring 251 mounted on the radially inner surface of the piston inner sidewall, together with an elastomeric seal 252 acting between the inner sidewall 250 and the inner cylindrical wall 222 of the body 221, and an elastomeric ring 253 which acts to bias the sealing ring 251 against the inner cylindrical wall 222.

The primary piston 241 is biased away from the gearbox by an annular spring 254 and annular follower 255 located within the fluid chamber 260 formed between the two walls 222, 223 of the body 221. The annular spring 254 pro-loads the bearing 60 against the diaphragm spring fingers of the clutch and acts only for the initial piston travel. The spring 254 can be a coil spring or a belleville spring and reacts against the retainer cup 248. The pre-load exerted by the spring is constant for all conditions of driven plate wear.

A secondary piston 270 is sealingly slideable on the primary piston member 241, and comprises a radially outer sidewall 271 having a plastics ring 272 and elastomeric seal 273, that seals against the outer sidewall 244 of the piston member 241, and a radially inwardly projecting flange 274 having a plastics seal ring 275 and elastomeric seal 246 that seals against the inner sidewall 250, to form a secondary fluid chamber 280. The secondary fluid chamber 280 is connected to the first fluid chamber 250 through a valve means 282. The valve 282 is a poppet valve of the type substantially described with reference to FIG. 1. The stem 287 of the valve passes through an orifice 288 in the flange 245 of the primary piston, and can contact the retainer cap 248, when the primary piston is in a fully retracted condition.

The annular clutch release bearing 60 is secured on the outer surface of the secondary piston and its rotary race is connected to an intermediate plate 67 to abut the fingers of a diaphragm spring as previously described.

On initial fitting to a vehicle the piston member 241 is held in position shown in FIG. 6 by plastics deliver) stops 290. When pressurised fluid is introduced into the slave cylinder 216 it will fill two chambers 260 and 280. A further pressure will cause the secondary piston 270 to move the bearing plate 67 into abutment with the diaphragm spring fingers. The area of the secondary piston exposed to fluid pressure is about 60% of the area of the primary piston 241 exposed to fluid pressure. Thereafter as fluid pressure builds up the stops 290 either burst or may be removed in other ways and the primary piston 241 will then move to operate the clutch by exerting a release load on the diaphragm spring fingers. This allows the valve member 282 to close isolating the second chamber 280. When the fluid pressure is released the spring fingers will push against the secondary piston 270, but since the valve means 282 is closed, the primary piston means 241 is returned by the load in the diaphragm spring fingers acting on the secondary piston 270 until the flange 245 abuts the spring follower 255 and is held away from the fully retracted piston in an "at-rest" condition by the spring 254 at which point the valve means 282 is held closed by the spring 285.

As the clutch plate wears the secondary piston 270 is moved into the primary piston 241 as described previously. Eventually the secondary piston 270 will abut the flange 224, as shown in dotted outline, when the clutch is fully worn.

I claim:

1. A clutch hydraulic slave cylinder (16) comprising a cylinder body (14), a primary piston (41) sealingly reciprocable relative to the body and cooperating with the body to form a first fluid chamber (60) within said body, and a secondary piston (70) sealingly reciprocable relative to the primary piston and co operating with the primary piston to form a second fluid chamber (80), the second fluid chamber being connected to the first fluid chamber through a valve means (82) characterised in that the primary piston (41) is biased by spring means (54) from a fully retracted condition to an "at-rest" condition in which it can exert a pre load on a clutch bearing, and said valve means (82) is open when the primary piston is in the fully retracted condition and is closed when the primary piston is in the "at-rest" condition.

2. A hydraulic slave cylinder as described in claim 1 characterised in that the area of the secondary piston (70) exposed to fluid pressure is substantially smaller than the area of the primary piston (41) exposed to fluid pressure.

3. A hydraulic slave cylinder as claimed in claim 1 characterised in that said valve means (82) is a poppet valve having a head (83) and a stem (87), the head being located in the secondary chamber (80) and the stem extending through an orifice (88) in the primary piston (41), the head (83) being biased into a closed condition and the stem (87) being abuttable against a fixed location on the cylinder body (14).

4. A slave cylinder as claimed in claim 1 in which the cylinder body (14) has a cylindrical bore (15) therein and the primary piston reciprocates within the bore characterised in that the primary piston (41) has a co-axial bore (22) therein and the secondary piston (70) reciprocates within the coaxial bore of the primary piston.

5. A slave cylinder as claimed in claim 4 characterised in that the primary piston (41) can tilt relative to the axis of the bore (15).

6. A slave cylinder as claimed in claim 5 characterised in that the primary piston (41) extends through the mouth of its respective bore (15), and the secondary piston (70) also extends through the mouth of its respective co-axial bore (22).

7. A slave cylinder as claimed in claim 4 characterised in that the primary piston (41) is sealed to the bore (15) by an elastomeric boot (53) which forms a fluid reservoir (V), and fluid can leak across a primary piston seal (47) into the reservoir (V), and can flow easily back from the reservoir into the first fluid chamber (60).

8. A slave cylinder as claimed in claim 7 characterised in that the slave cylinder body (14) has a cylindrical bore (15) the mouth (19) of which is enclosed in a cover (110) whereby the body is mounted in position in use.

9. A slave cylinder as claimed in claim 8 characterised in that the primary piston (141) comprises a piston body formed from sheet metal components comprising a base portion (142), a forward portion (143) located on one axial side of the base portion and having an axial extention (144) thereon, and a seal retainer (158) located on the other axial side of the base portion.

10. A slave cylinder as claimed in claim 4 characterised in that the secondary piston (170) is formed from sheet metal components.

11. A slave cylinder as claimed in claim 9 characterised in that the axial extension (144) of the primary piston (141) is supported and guided (181) on the internal surface (182) of the cover (110).

12. A slave cylinder as claimed in claim 11 characterised in that the secondary piston (170) can tilt relative the axis of its respective bore.

13. A slave cylinder as claimed in claim 9 characterised in that the working travel (W1) of the primary piston (141) is limited by an abutment of the extension (144) on the cover (110).

14. A slave cylinder as claimed in claim 4, characterised in that the slave cylinder body (14) comprises a series of stepped bores, and a primary piston guide (316) is located in one of the bores (315), and the primary piston seal (347) reciprocates in a second adjacent stepped bore (318).

15. A slave cylinder as claimed in claim 1 characterised in that the primary piston seal (347) is supported on one axial side on a guide ring (345) which slideably engages the respective bore (318) in which the seal (347) reciprocates.

16. A slave cylinder as claimed in claim 7 characterised in that the elastomeric boot (53) is formed from a fabric reinforced elastomeric material.

* * * * *